US010303618B2

(12) United States Patent
King

(10) Patent No.: US 10,303,618 B2
(45) Date of Patent: *May 28, 2019

(54) POWER SAVINGS VIA DYNAMIC PAGE TYPE SELECTION

(71) Applicant: International Business Machines Corporation, Armonk, NY (US)

(72) Inventor: Justin K. King, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 884 days.

This patent is subject to a terminal disclaimer.

(21) Appl. No.: 13/626,297

(22) Filed: Sep. 25, 2012

(65) Prior Publication Data

US 2014/0089608 A1 Mar. 27, 2014

(51) Int. Cl.
*G06F 12/10* (2016.01)
*G06F 12/1027* (2016.01)
(Continued)

(52) U.S. Cl.
CPC .......... *G06F 12/1027* (2013.01); *G06F 12/08* (2013.01); *G06F 12/1081* (2013.01);
(Continued)

(58) Field of Classification Search
CPC ....... G06F 2212/205; G06F 2212/7201; G06F 12/10; G06F 12/06; G06F 12/02;
(Continued)

(56) References Cited

U.S. PATENT DOCUMENTS 4,878,166 A 10/1989 Johnson et al.
5,381,538 A 1/1995 Amini et al.
(Continued)

FOREIGN PATENT DOCUMENTS

WO 2011106049 A1 9/2011

OTHER PUBLICATIONS

Ramos, Luiz et al., "Page Placement in Hybrid Memory Systems," Proceedings of the International Conference on Supercomputing, Jun. 2011, pp. 85-95, ACM, New York, United States.
(Continued)

*Primary Examiner* — Prasith Thammavong
*Assistant Examiner* — Alex G. Olson
(74) *Attorney, Agent, or Firm* — Patterson + Sheridan, LLP

(57) ABSTRACT

An operating system monitors a performance metric of a direct memory access (DMA) engine on an I/O adapter to update a translation table used during DMA operations. The translation table is used during a DMA operation to map a virtual address provided by the I/O adapter to a physical address of a data page in the memory modules. If the DMA engine is being underutilized, the operating system updates the translation table such that a virtual address maps to physical address corresponding to a memory location in a more energy efficient memory module. However, if the DMA engine is over-utilized, the operating system may update the translation table such that the data used in the DMA engine is stored in memory modules that provide quicker access times—e.g., the operating system may map virtual addresses to physical addresses in DRAM rather than phase change memory.

15 Claims, 5 Drawing Sheets

(51) Int. Cl.
  *G06F 12/08* (2016.01)
  *G06F 12/1081* (2016.01)
  *G06F 12/1009* (2016.01)
(52) U.S. Cl.
  CPC .... *G06F 12/1009* (2013.01); *G06F 2212/205* (2013.01); *Y02D 10/13* (2018.01)
(58) Field of Classification Search
  CPC ............... G06F 12/0638; G06F 12/109; G06F 2212/222; G06F 2201/81; G06F 2212/1028; G06F 13/287
  USPC ........................................................ 711/207, 5
  See application file for complete search history.

(56) References Cited

U.S. PATENT DOCUMENTS

| | | | | |
|---|---|---|---|---|
| 5,828,901 | A * | 10/1998 | O'Toole | G06F 13/28 710/22 |
| 5,887,134 | A | 3/1999 | Ebrahim | |
| 5,983,301 | A * | 11/1999 | Baker et al. | 710/113 |
| 6,078,532 | A * | 6/2000 | Rivers et al. | 365/194 |
| 6,647,438 | B1 | 11/2003 | Connor et al. | |
| 6,823,403 | B2 * | 11/2004 | Gulick et al. | 710/22 |
| 7,130,932 | B1 * | 10/2006 | Ghaffari | 710/22 |
| 7,581,064 | B1 * | 8/2009 | Zedlewski | G06F 12/084 711/118 |
| 7,623,134 | B1 * | 11/2009 | Danilak | G06F 12/08 345/537 |
| 2003/0023825 | A1 * | 1/2003 | Woo | G06F 12/023 711/170 |
| 2003/0233497 | A1 | 12/2003 | Shih | |
| 2005/0240745 | A1 * | 10/2005 | Iyer et al. | 711/167 |
| 2006/0224858 | A1 * | 10/2006 | Wang | G06F 9/30043 711/202 |
| 2006/0288130 | A1 | 12/2006 | Madukkarumukumana et al. | |
| 2007/0106860 | A1 * | 5/2007 | Foster, Sr. | G06F 1/3225 711/170 |
| 2007/0168636 | A1 * | 7/2007 | Hummel et al. | 711/202 |
| 2007/0288692 | A1 * | 12/2007 | Bruce | G06F 3/061 711/113 |
| 2008/0209018 | A1 * | 8/2008 | Hernandez et al. | 709/222 |
| 2009/0106478 | A1 * | 4/2009 | Okin et al. | 711/1 |
| 2009/0182969 | A1 * | 7/2009 | Norgaard | G06F 13/385 711/170 |
| 2009/0268513 | A1 * | 10/2009 | De Ambroggi et al. | 365/163 |
| 2010/0095053 | A1 * | 4/2010 | Bruce et al. | 711/103 |
| 2010/0198997 | A1 * | 8/2010 | Archer et al. | 710/22 |
| 2011/0161748 | A1 * | 6/2011 | Casper et al. | 714/708 |
| 2012/0005459 | A1 * | 1/2012 | Fleischman | G06F 9/30032 712/216 |
| 2012/0079232 | A1 * | 3/2012 | Hinton et al. | 711/207 |
| 2012/0117301 | A1 * | 5/2012 | Wingard | G06F 12/1027 711/6 |
| 2012/0117304 | A1 * | 5/2012 | Worthington et al. | 711/103 |
| 2012/0191956 | A1 * | 7/2012 | Fleischman | G06F 9/384 712/222 |
| 2012/0198141 | A1 * | 8/2012 | Karamcheti | G06F 9/5016 711/103 |
| 2012/0284436 | A1 * | 11/2012 | Casper et al. | 710/74 |
| 2013/0283079 | A1 * | 10/2013 | Puthiyedath et al. | 713/323 |
| 2013/0339572 | A1 * | 12/2013 | Fanning et al. | 711/102 |
| 2014/0013045 | A1 * | 1/2014 | Crossland et al. | 711/105 |
| 2014/0047251 | A1 * | 2/2014 | Kottilingal et al. | 713/320 |
| 2014/0089631 | A1 | 3/2014 | King | |

OTHER PUBLICATIONS

Pandey, Vivek et al., "DMA-Aware Memory Energy Management," 12th International Symposium on High-Performance Computer Architecture, Feb. 2006, Rutgers School of Arts and Sciences: Computer Science, Piscataway, United States.

* cited by examiner

| TRANSLATION TABLE | 145A |
|---|---|
| VIRTUAL ADDRESS | PHYSICAL ADDRESS |
| 0x1000 - 0x1FFF | MEMORY LOCATION ON RAM DEVICE 1 |
| 0x2000 - 0x2FFF | MEMORY LOCATION ON RAM DEVICE 2 |
| 0x3000 - 0x3FFF | MEMORY LOCATION ON RAM DEVICE 1 |
| ⋮ | ⋮ |

305A: 0x1000 - 0x1FFF
305B: 0x2000 - 0x2FFF
305C: 0x3000 - 0x3FFF

FIG. 3A

| TRANSLATION TABLE | 145B |
|---|---|
| VIRTUAL ADDRESS | PHYSICAL ADDRESS |
| 0x1000 - 0x1FFF | MEMORY LOCATION ON RAM DEVICE 2 |
| 0x2000 - 0x2FFF | MEMORY LOCATION ON RAM DEVICE 2 |
| 0x3000 - 0x3FFF | MEMORY LOCATION ON RAM DEVICE 1 |
| ⋮ | ⋮ |

305D: 0x1000 - 0x1FFF
305E: 0x2000 - 0x2FFF
305F: 0x3000 - 0x3FFF

FIG. 3B

POWER SAVINGS VIA DYNAMIC PAGE TYPE SELECTION

BACKGROUND

Computing systems often include I/O adapters that are configured to communicate over a network or connect to periphery devices that enhance the capability of the computing system, such as providing additional storage. If the I/O adapter is coupled to an Ethernet network, for example, packets of data are sent from computer to computer according to one or more communication protocols, such as Transmission Control Protocol (TCP) and Internet Protocol (IP). Each computer in the network may include an I/O Ethernet adapter configured to facilitate communications between an operating system (OS) running on each of the respective computing systems. The operating systems may include a device driver configured to interact with the I/O adapter of the respective computer.

SUMMARY

One embodiment of the present disclosure is a method of optimizing a computing system. The method includes receiving a performance metric associated with a data access engine where the data access engine is configured to assist in performing at least one memory access operation in one of a first memory module and a second memory module in the computing system. Furthermore, the first and second memory modules are different types of memory devices having different performance attributes. Based on the performance metric, the method includes reconfiguring an address translation table such that a first entry in the table re-maps a first virtual address from a first physical address corresponding to the first memory module to a second physical address corresponding to the second memory module in order to effect a change in the utilization of the data access engine.

Another embodiment of the present disclosure is a computer program product for optimizing a computing system including a computer-readable storage medium having computer-readable program code embodied therewith, the computer-readable program code comprising computer-readable program code configured to receive a performance metric associated with a data access engine. The data access engine is configured to assist in performing at least one memory access operation in one of a first memory module and a second memory module in the computing system. Furthermore, the first and second memory modules are different types of memory devices having different performance attributes. Based on the performance metric, the computer-readable program is configured to reconfigure an address translation table such that a first entry in the table re-maps a first virtual address from a first physical address corresponding to the first memory module to a second physical address corresponding to the second memory module in order to effect a change in the utilization of the data access engine.

Another embodiment of the present disclosure is a computing system that includes a first memory module and a second memory module where the first and second memory modules are different types of memory devices having different performance attributes. The computing system includes a data access engine configured to assist in performing the memory access operation in one of the first memory module and the second memory module and a memory manager module configured to receive a performance metric associated with the data access engine. Based on the performance metric, the memory manager module is configured to reconfiguring an address translation table such that a first entry in the table re-maps a first virtual address from a first physical address corresponding to the first memory module to a second physical address corresponding to the second memory module in order to effect a change in the utilization of the data access engine

BRIEF DESCRIPTION OF THE SEVERAL VIEWS OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

FIGS. 3A-3B illustrate translation tables used when performing an address translation, according to embodiments described herein.

DETAILED DESCRIPTION

Figure 1:
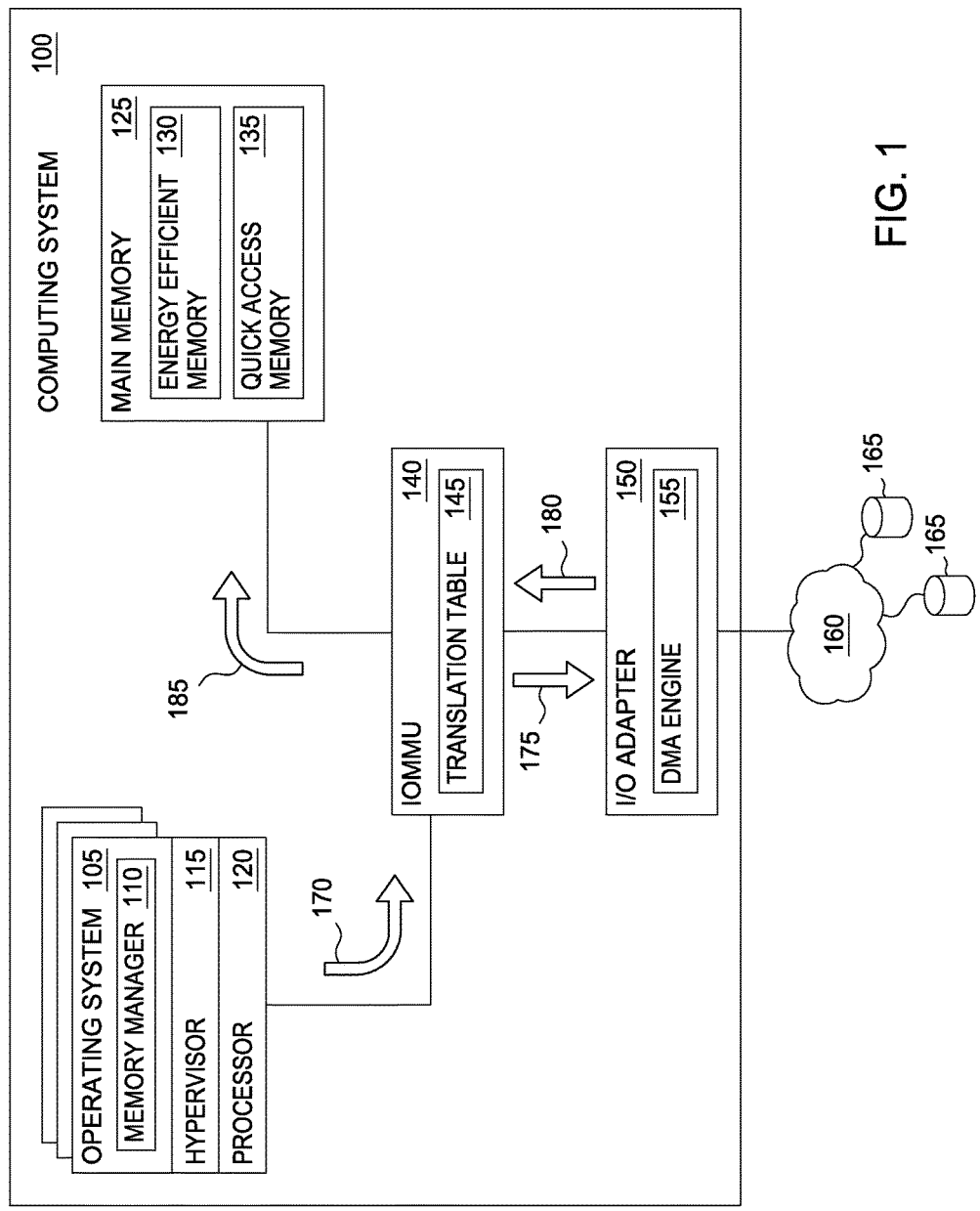
FIG. 1 illustrates a computing system for performing a direct memory access operation, according to one embodiment described herein.

Embodiments described herein manage an address translation table to map memory pages to different types of memory modules. Different types of memory—e.g., DRAM, SRAM, phase change memory (PCM), memristor, Flash memory, and the like—offer different advantages and disadvantages. For example, PCM (also known as PCME, PRAM, PCRAM, Chalcogenide RAM, C-RAM, and the like) requires less energy than DRAM to read data from and write data to its memory banks. However, PCM generally has slower access times than DRAM. In a computer system where the addressable memory space includes different types of memory—e.g., both DRAM and PCM memory modules—the operating system may monitor one or more performance metrics to determine how to allocate the memory space provided by the different types of memory modules.

In one embodiment, the operating system monitors the utilization of a direct memory access (DMA) engine that performs DMA writes and read operations. Based on the utilization, the operating system updates a translation table that allocates the physical memory to I/O devices coupled to the DMA engine. Specifically, the translation table is used during a DMA operation to map a virtual address provided by the I/O device to a physical address in the memory modules. If the DMA engine is underutilized, the operating system may update the translation table such that additional virtual address maps to a memory location on a more energy efficient memory module. For example, if the DMA engine is performing read/write operations only 40% of the time, the operating system may map more virtual addresses in the translation table to PCM modules instead of DRAM modules. Doing so may require more time for the DMA operation to complete, but the computing system may consume less power when performing the operation. Alternatively, if the operating system determines that the DMA engine is over-utilized—e.g., is busy 85% of the time—some portion of the virtual addresses may be mapped to DRAM which provides greater access speeds than PCM. Accordingly, the DMA operation may be performed in a shorter amount of time, thereby decreasing the utilization of the DMA engine but increasing the amount of power drawn relative to performing the DMA operation using PCM.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 is a computing system 100 for performing a DMA operation, according to one embodiment described herein.

The computing system 100 includes an operating system (OS) 105, processor 120, main memory 125, input/output memory management unit (IOMMU) 140, and input/output (I/O) adapter 150. In one embodiment, the computing system 100 uses the I/O adapter 150 to transfer data to, and receive data from, a network 160 that includes one or more external storage elements or I/O devices 165. Specifically, the computing system 100 may use these different hardware, firmware, or software components to perform DMA operations between the I/O adapter 150 and the main memory 125.

A DMA operation is a feature the permits the computing system 100 to access memory independently of the processor 120 (e.g., a central processing unit that may include multiple cores or multiple processing elements). Without DMA, when the processor 120 uses programmed input/output, the processor 120 may be occupied for the entire duration of the read or write operation, and thus, is unavailable to perform other tasks. With DMA, the processor 120 initiates the transfer, may perform other tasks, and receives an interrupt from a DMA controller—e.g., IOMMU 140—when the DMA operation is complete. Arrow 170 illustrates that the processor 120 transmits an instruction to the IOMMU to perform a DMA operation. For example, the processor 120 may initiate the DMA in response to a cache miss or a data request from the OS 105. The IOMMU 140 instructs the I/O adapter 150 (as shown by arrow 175) to retrieve one or more chunks of data (e.g., data pages) from a connected device. As shown in FIG. 1, the I/O adapter 150 (e.g., a network card) is coupled to a network 160 which communicatively couples the adapter 150 to the I/O devices 165 or data repositories. However, in other embodiments, the I/O adapter 150 may be a disk drive controller, graphics card, sound card or other adapter that permits a connection to a periphery device—e.g., Fibre Channel or InfiniBand® connections (InfiniB and is a registered trademark of the InfiniBand Trade Association). In these embodiments, the network 160 may be omitted.

If the DMA access is a write operation, a DMA engine 155, which may be firmware, hardware, or some mixture of both, transmits the DMA request to the I/O devices 165 using, for example, an Ethernet network 160. The I/O devices 165 then return the requested data chunks to the DMA engine 155. As shown by arrow 180, the DMA engine 155 transfers the retrieved data chunks to the IOMMU 140 which maps the device-specific virtual address (also called I/O addresses) associated with the data chunks to physical memory address of the computer system 100 using the translation table 145. That is, I/O adapter 150, DMA Engine 155, and the IOMMU 140 retrieve and store data in the I/O devices 165 using virtual addresses to avoid having to allocate a large portion of contiguous physical memory of the main memory 125 to the I/O devices 165. Instead, the IOMMU 140 uses the translation table 145 to map these contiguous virtual addresses to physical addresses that may be fragmented—e.g., located in different memory modules in main memory 125.

Once the IOMMU 140 identifies the physical addresses corresponding to the retrieved data chunks, as shown by arrow 185, the IOMMU 140 transfers the data chunks to be stored as, for example, data pages in the main memory 125. The processor 120 may then retrieve these data pages using the IOMMU 140 or a different communication path not shown in computing system 100. The processor 120 may initiate a DMA read in a similar manner except that the IOMMU 140 retrieves data from the main memory 125, uses the translation table 145 to map the physical addresses to device-specific virtual addresses, and transmits the data to the I/O adapter 150 and DMA engine 155 which store the data in a connected device.

The computing system 100 also includes a hypervisor 115 which permits multiple operating systems to run concurrently on the system 100. Specifically, the hypervisor 115 enables the different operating systems to access and share the hardware resources of the computing system 100. As such, computing system 100 may include multiple operating systems 105 which may each include a memory manager 110. Of course, the hypervisor 115 may be optional if, for example, the computing system 100 does not use multiple operating systems 105. In one embodiment, the memory manager 110 has access to performance metrics associated with the DMA engine 155. For example, the memory manager 110 may determine a current or average utilization rate of the DMA engine 155 which indicates the ratio the engine 155 is idle compared to when it is performing a DMA operation. Depending on the performance metric, the memory manger 110 may update the translation table 145 to change the mappings from the virtual addresses to the physical memory address. For example, if the utilization rate of the DMA engine 155 is above 80%, the memory manager 110 may update the table 145 such that certain virtual addresses now map to physical memory address associated with memory modules that provide quick access instead of memory modules that are more energy efficient but have slower access times. If computing system 100 includes a plurality of operating systems 105, each OS 105 may be allocated a different portion of the translation table 145 to manage —i.e., a certain range of the total addressable memory space of the computing system 100 —to enable memory protection. Although embodiments herein discuss monitoring performance metrics of the DMA engine, other components may be monitored. For example, similar performance metrics may be monitored on the IOMMU 140, the main memory 125, or even the external I/O devices 165 to determine if these components are over- or underutilized. In response, the translation table 145 may be updated as discussed below.

The main memory 125 includes a least two different types of memory: energy efficient memory 130 and quick access memory 135. The energy efficient memory 130 may include any number of specific types of memory modules —e.g., PCM or memristor—that require less energy to perform either read or write operations compared to performing the same operation on the quick access memory 135. On the other hand, the quick access memory 135 may include any number of different types of memory modules that perform read or write operations in shorter times than performing the same operation on the energy efficient memory 130. For example, main memory 125 may include both PCM and memristor memory modules that make up the energy efficient memory 130 and DRAM and SRAM that make up the quick access memory 135. Thus, as used herein, energy efficient memory 130 and quick access memory 135 are groupings of physical memory units in the main memory 125 that may be characterized as described above. Moreover, each memory module in the main memory 125 may be assigned different rank for energy efficiency or access speeds. Thus, the memory modules making up the energy efficient memory 130 and quick access memory 135 may be further divided by the respective rankings.

In one embodiment, the main memory 125 may be any memory that is external to the processor 120 in the computing system 100—i.e., is not built into the integrated circuit of the processor 120. For example, the main memory 125 may include one or more levels of cache memory as well as random access memory but may exclude memory coupled to I/O adapters 150 such as external storage networks or disk drives. As used herein, a "memory module" may be any physical hardware element (e.g., a single memory unit or a stack of memory units) that store data bits using a particular method such as charge on capacitors, a network of transistors, phase change material, and the like.

Figure 2:
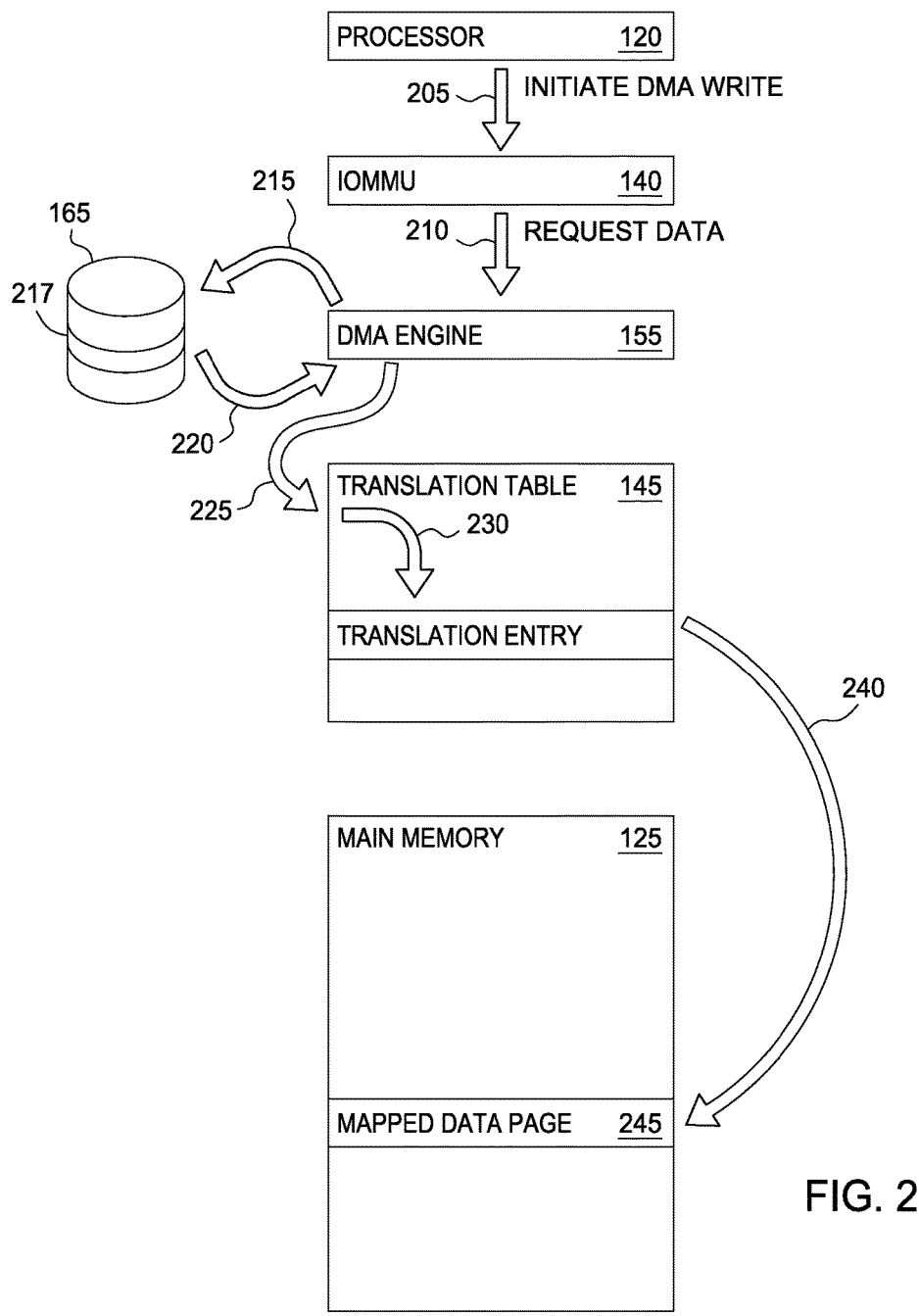
FIG. 2 is a flow diagram for performing a direct memory access write operation, according to one embodiment described herein.

FIG. 2 is a flow diagram for performing a DMA write operation, according to one embodiment described herein. As shown by arrow 205, the processor 120 initiates a DMA write operation by transmitting one or more instructions to the IOMMU 140. In one embodiment, the processor 120 provides a specific I/O port to use for the DMA operation, the direction of the I/O transfer (a read or write), and the number of bytes to transfer from the I/O device. The IOMMU 140 forwards the data request to the DMA engine 155 as shown by arrow 210. In one embodiment, the IOMMU 140 is a hardware element fabricated within the processor 120; however, in other embodiments the IOMMU 140 may either be a separate hardware element or firmware operating on a different hardware component in the computing system.

In one embodiment, a computing system may have a plurality of I/O adapters that each has a DMA engine 155. Accordingly, the IOMMU 140 may determine which DMA engine should receive the request based on the I/O port specified by the processor 120. The DMA engine 155 sends a request 215 to a coupled I/O device 165 using any one of a number of communication protocols or standards—e.g., Ethernet, Fibre Channel, Infiniband, etc. The I/O device 165 responds by transmitting a data chunk 217 back to the DMA engine 155 as shown by arrow 220. The DMA engine 155 or the IOMMU 140 may increment a byte count until it has retrieved all the bytes specified by the instructions received from the processor 120. In one embodiment, the DMA engine 155 measures one or more performance metrics, such as idle time, time spent performing DMA operations, power consumed, heat emitted, and the like, that indicate a utilization of the engine 155. The DMA engine 155 may also record past performance metrics to derive, for example, an average value of the performance metric.

As shown by arrow 225, the DMA engine 155 forwards the data chunk to the translation table 145 of the IOMMU 140 either one data word at a time or in a burst mode using, for example, a PCI type connection. In one embodiment, the table 145 includes a plurality of translation entries that map one or more virtual addresses associated with the data chunk to physical memory addresses in a computing system. For example, one entry in the translation table may indicate that virtual addresses 0x1000-0x1FFF map to a specific memory module in main memory 125 while virtual addresses 0x2000-0x2FFFF may map to a different memory module. In this manner, the contiguous virtual addresses may be mapped to fragmented physical addresses —e.g., non-contiguous memory addresses assigned to different memory modules. Accordingly, the translation table 145 may also be considered as a routing table that assigns a physical address to the data chunk that indicates an assigned storage location in the computing system. After identifying the correct physical address as shown by arrow 230, the IOMMU 140 forwards the data chunk to the main memory 125 which may store the data chunk as one or more mapped data pages 245 based on the physical address. The data page 245 may be located on a single memory module or may span between two different physical memory modules. The processor 120 may then retrieve the data page 245 from the main memory 125 in response to, for example, a request from the OS.

FIGS. 3A-3B illustrate translation tables 145A-B that are used when performing an address translation, according to embodiments described herein. Specifically, FIGS. 3A-3B show different translation entries 305A-F in the translation tables 145A-B. In table 145A, the range of device-specific virtual addresses 0x1000-0x1FFF maps to a memory location on RAM device 1. The particular physical address is not shown in the translation entries 305 and varies depending on the configuration of the computer system. For example, the virtual address may be a 32 bit address schema while the main memory of the computing system uses a 64 bit addressing schema. Moreover, instead of a range of virtual addresses, in one embodiment, the tables 145A may map single virtual addresses to respective physical addresses in the memory. As used herein, the RAM device may be any memory module that functions as main memory in the computing device such as PCM, memristor, flash, DRAM, SRAM, and the like.

In FIG. 3B, entry 305D in translation table 145B is changed relative to entry 305A in translation table 145A. In one embodiment, the memory manager (not shown) may update the translation table 145B to map the virtual addresses to different physical addresses. Further still, the memory manager may select physical addresses that correspond to a memory location on a different RAM device. Here, the physical address (or addresses) associated with the virtual address range 0x1000-0x1FFF are mapped to a memory location on RAM device 2 instead of RAM device 1. That is, if the computing system performs a DMA write operation and retrieves a data chuck with a virtual address in the range of entry 305D, the data is stored in RAM device 2. In one embodiment, when updating the translation table 145 as shown, the memory manager moves any data already stored at the previous physical address to the new physical address. This ensures that if the processor initiates a DMA read operation, the correct data will be stored at the new physical address when the DMA engine sends the data page to the I/O device for storage.

Figure 4A:
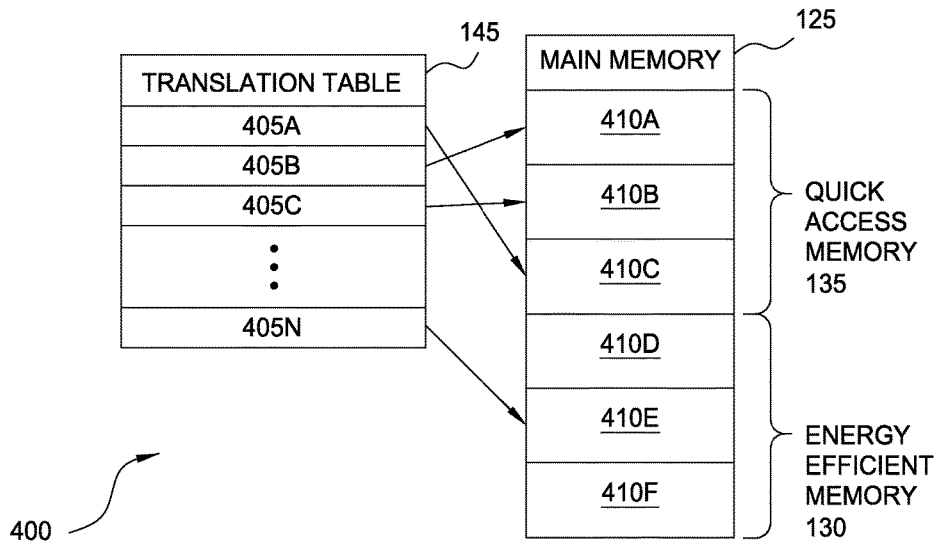
FIGS. 4A-4B illustrate modifying a translation table to assign memory address to different types of memory modules, according to embodiments described herein.
Figure 4B:
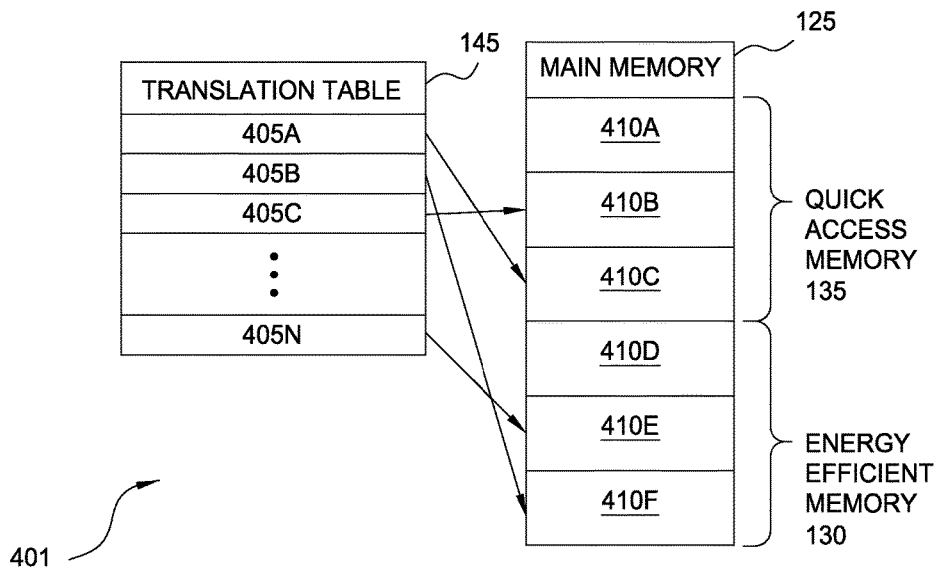

FIGS. 4A-4B illustrate modifying a translation table to assign memory address to different types of memory elements, according to embodiments described herein. Memory map 400 illustrates graphically the mapping between different translation entries 405A-N and memory locations 410A-F in main memory 125. As shown by the arrows, the virtual address in entry 405A maps to the memory location 410C, the virtual address in entry 405B maps to memory location 410A, and so forth. In one embodiment, the memory locations 410 may include one or more different data pages. That is, the translation entries 405 may map to either a single data page or multiple data pages.

The main memory 125 is divided such that memory locations 410A-C are within the quick access memory 135 while memory locations 410D-F are in the energy efficient memory 130. These memory locations 410 may designate individual memory modules or may map to a sub-portion of a memory module. For simplicity, assume that memory locations 410A-C define three different sub-portions of a single quick access memory module—e.g., a DRAM module—while memory locations 410D-F define three different sub-portions of a single energy efficient memory module—e.g., a PCM module. In this case, at least three entries 405A-C of the translation table 145 map to the DRAM module while only one entry 405N of the table 145 maps to a memory location in the PCM module.

In the memory map 401 illustrated in FIG. 4B, entry 405B is changed to map to memory location 410F of the PCM module instead of memory location 410A in the DRAM module. In one embodiment, the entries 405 in a translation table may be associated with a specific DMA engine in a computing system. Stated differently, a computer system may include a plurality of DMA engines on a plurality of I/O adapters but allocate a specific number of translation entries 405 to each DMA engine in the system. In one embodiment, the memory manager may monitor the DMA engine to determine its current utilization. If the DMA engine is underutilized—e.g., the engine has at least some idle time where it is not performing DMA operations—the memory manager may change the physical address in one of the entries that previously mapped to a quick access memory 135—the DRAM—to a physical address on the energy efficient memory 130—the PCM. Accordingly, the next time the DMA engine performs a DMA operation involving the changed entry 405B, the operation may take more time to complete but consume less power than if the entry still mapped to a DRAM module.

Figure 5:
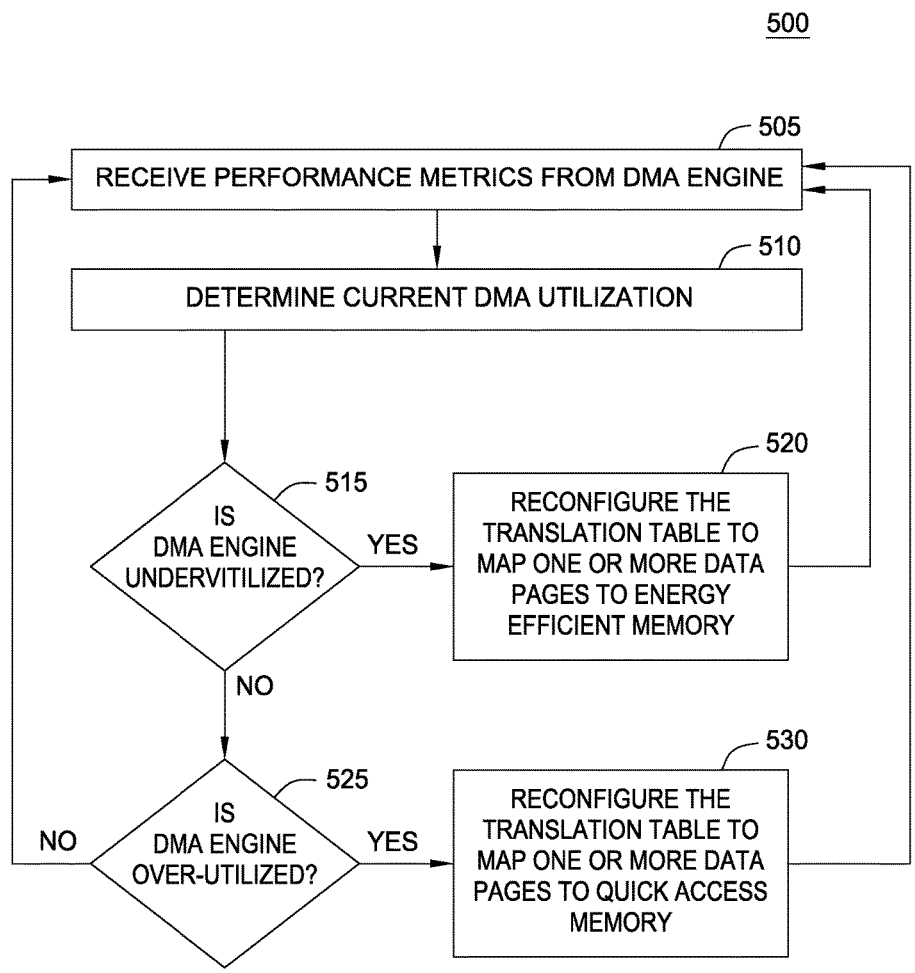
FIG. 5 is a flow chart for modifying a translation table based on one or more performance metrics, according to one embodiment described herein.

FIG. 5 is a flow chart 500 for modifying a translation table based on one or more performance metrics, according to one embodiment described herein. At block 505, a memory manager may receive I/O statistics or performance metrics from an associated DMA engine. In one embodiment, a computing system may have multiple operating systems running concurrently which may each contain a memory manager for updating a portion of a translation table for performing DMA operations. These memory managers may receive the performance metrics from all the DMA engines in the computing system or from only select DMA engines. The performance metrics may be any value that may be used to determine a performance status of the DMA engine. Examples of performance metrics includes an average utilization rate, processing time, idle time, temperature, power consumption, fan speed on the adapter, utilization of special cache memory on the I/O adapter, and the like. In one embodiment, the DMA engine may transmit the performance metrics to the memory manager periodically according to a predefined interval or in response to a particular event.

In one embodiment, the DMA engine may transmit a utilization rate to the memory manager, or, the memory manager may derive a utilization rate based on received performance metrics such as the idle time or processing time. A utilization rate of 70% may indicate that the DMA engine performs DMA operations 70% of the time and is idle 30% over some defined period of time. In one embodiment, the utilization rate may be an average rate based on historical as well as current performance data. Accordingly, the memory manager may periodically update the utilization rate as it receives additional performance metrics from the DMA engine.

The memory manager may also monitor the power consumption or the temperature of the DMA engine. The memory manager may determine the performance status of the DMA engine by evaluating the current measurement of these performance metrics, or, alternatively, generate an average of these metrics based on historical and current values. Moreover, the memory manager may combine any of the different types of performance metrics to identify the status of the DMA engine using a weighted average or other type of statistical distribution.

At block 510, the memory manager determines whether a particular DMA engine is over- or underutilized by evaluating the performance metrics received from the DMA engine. That is, memory manager characterizes the status of the DMA engine as over- or underutilized. If the performance metric being evaluated is the utilization rate, the memory manager may compare this rate to a predefined threshold or target. If the utilization rate is above the target, the memory manager may classify the performance status of the DMA engine as over-utilized, but if the rate is below the target, the DMA engine is underutilized. Alternatively, the memory manager may establish multiple thresholds that establish a range. If the utilization rate is above an upper threshold of the range, the engine is over-utilized; if the rate is below a lower threshold of the range the DMA engine is underutilized. If the rate is between the thresholds, however, the memory manager may not take any action. The memory manager may also establish thresholds for different performance metrics in a similar manner. For example, the memory manager may compare the current or average power consumption to a predefined wattage value. Further still, in one embodiment, the memory manager may require two or more performance metrics to exceed or fall below respective thresholds before classifying the DMA engine as over- or underutilized.

At block 515, the memory manager determines whether the DMA engine is underutilized based on comparing the performance metrics to one or more predefined thresholds. If so, at block 520, the memory manager reconfigures the translation table to map one or more data pages to a more energy efficient memory unit. As stated previously, at least a portion of the memory modules in a computing system may be characterized as either energy efficient memory or quick access memory. The memory manager is able to change the entries in a translation table to map virtual addresses to either the energy efficient memory or the quick access memory. If an entry in the translation table maps to an energy efficient memory, a DMA operation involving that memory may take more time to perform than a DMA operation involving a quick access memory but may consume less power. Stated in more general terms, upon determining that the DMA engine is underutilized, the memory manager remaps at least one data page to a more energy efficient memory than the current memory module. For example, the main memory 125 may rank all the different types of memory modules according to energy efficiency. If the DMA engine is underutilized, the memory manager moves the data page to a more energy efficient memory based on the ranking.

In one embodiment, the memory manager may choose a data page at random or based on an order in the translation table. Additionally, the memory manager may use an optimization algorithm to select a particular memory module to map the data page to. For example, different energy efficient memory modules may consume different amounts of a power. A memristor may consume 90% of the power consumed by PCM when performing the same memory access operation. As such, the memory manager may first attempt to assign the selected memory page to the memory unit that is most efficient —i.e., the memristor. Before changing the translation table, however, the memory manager may first estimate whether doing so will cause the DMA engine to be over-utilized. That is, the memory manager may be preconfigured with the relative access speeds (read/write durations) for the different types of memory modules in the computing system. Here, assume the access speed of the memristor is too slow to maintain the utilization rate of the DMA engine at the desired threshold. In response, the memory manager may then attempt to map the selected data page to the next most energy efficient memory —e.g., the PCM. If the access speed for this memory module would not cause the DMA engine to become over-utilized, the memory manager updates the translation entry corresponding to the selected data page to point to a memory location on the identified memory module. In one embodiment, to preserve computational overhead, the memory manager may remap a plurality of data pages simultaneously. Instead of determining if each data page can successfully be mapped to a more energy efficient memory module, the memory manager remaps a group of translation entries to a block of memory in the memory module.

In one embodiment, instead of selecting which data pages to remap randomly or based on the ordering of the entries in the translation table, the memory manager may use an optimization algorithm to select the specific data pages to move to a different memory type. For example, the memory manager may consider how often the data page is accessed. Because energy efficient memory may offer slower access times, remapping data pages that are accessed more frequently to the energy efficient memory may have a greater affect on the performance of the DMA engine —e.g., its utilization rate. Accordingly, the memory manager may select which pages to map to an energy efficient memory module based on the degree the measured utilization rate falls below the predefined threshold. For example, if the threshold utilization rate is 70% and the current utilization rate is 40%, the memory manager may select a data page that is accessed more often than if the current utilization rate is 60%. An example of data pages that are accessed more often are control pages used in IBM's® AIX® operating system where the entire page may be over written multiple times during a single DMA operation. Stated differently, the memory manager may classify the data pages into different types which indicate how often each data page is accessed relative to other data pages. Or each data page may be assigned an access probability that may be derived by tracking historical data associated with previous DMA operations.

In another embodiment, assuming the data pages are accessed with the same frequency during a DMA operation, the memory manager may move more data pages to the energy efficient memory module when the utilization rate is 40% than when it is 60%. In this manner, the memory manager may adaptively select the number of pages to remap to a different memory module based on the how much the measured performance metric of the DMA engine differs from the predefined threshold or target. In one example, the memory manager may contain a plurality of thresholds where each threshold determines a percentage of the data pages to remap—e.g., if the utilization rate is 60%, 10% of the data pages are remapped, but if the rate is 50%, 30% of the pages are remapped. Alternatively, the memory manager may use, e.g., a predefined linear or exponential relationship between the measured performance metric and the data page to determine the number or type of data pages to remap.

In one embodiment, the memory manager determines which pages to select based on the difference between the measured performance metric and the desired threshold. After the pages are selected, the memory manager first checks to see if the pages can be moved to the most energy efficient memory modules without the DMA engine becoming over utilized. If not, the memory manager then performs the same comparison with the next most energy efficient type of memory module. Instead of evaluating the next most energy efficient memory module, the memory manager may select a different data page that is accessed less frequently or reduce the number of data pages to be remapped. This new data page may then be evaluated based on the most energy efficient memory module to determine if the DMA engine would be over-utilized. In one embodiment, the memory manager may vary both the type of memory module and the pages selected. Once the memory manager determines that the selected data pages may be mapped to a particular memory module without causing the DMA engine to become over-utilized, at block 520, the memory manager updates or reconfigures the entries of the translation table associated with the selected pages.

If the DMA engine is not underutilized, at block 525 the memory manager determines if the DMA engine is over-utilized. If so, at block 530 the memory manager reconfigures one or more entries of the translation table to map at least one data page to a quick access memory. In one embodiment, the memory manager remaps a data page from an energy efficient memory to a quick access memory as shown in FIGS. 4A-4B. Stated in more general terms, the memory manager changes the mapping of at least one data page to a memory module that offers quicker access times than the previous memory module—e.g., PCM to DRAM or DRAM to SRAM.

Moreover, the memory manager may use the different algorithms and strategies discussed above in regards to block 520 for determining which data pages to select and which memory modules to map the selected data pages to. For example, the memory manager may select a data page that is accessed frequently during a DMA operation and remap the selected page to a quicker access memory module. Moreover, the memory manager may determine whether doing so would cause the DMA engine to be underutilized. If so, the memory manager may either select a different data page (i.e., one that is accessed less frequently) or check to see if the next fastest memory module would also result in the DMA engine being underutilized. Once the mapping is determined, the memory manager reconfigures the entries of the translation table associated the selected data pages.

After reconfiguring the table at either block 520 or 530 or determining that the DMA engine is neither over- nor underutilized at block 525 (i.e., is within tolerable limits), the method 500 returns to step 505 to receive additional performance metrics from the DMA engine. For example, the DMA engine may send updated values for the performance metric which the memory manager uses to again compare to the predefined thresholds. In one embodiment, the memory manager may update the performance metric, such as the utilization rate, based on the current status of the DMA engine (e.g., whether it has been busy or idle for some period of time) and determine if the updated utilization rate results in the DMA engine being over- or under-utilized —i.e., repeat the method 500.

CONCLUSION

Embodiments described herein manage an address translation table to map memory pages to different types of memory modules. Different types of memory—e.g., DRAM, SRAM, PCM, memristor, Flash memory, and the like—offer different advantages and disadvantages. For example, PCM (also known as PCME, PRAM, PCRAM, Chalcogenide RAM, C-RAM, and the like) requires less energy than DRAM to read data from and write data to its memory banks. However, PCM generally has slower access times than DRAM. In a computer system where the addressable memory space includes different types of memory—e.g., both DRAM and PCM memory modules—the operating system may monitor one or more performance metrics to determine how to allocate the memory space provided by the different types of memory modules.

In one embodiment, the operating system monitors the utilization of the DMA engine that performs DMA writes and read operations. Based on the utilization, the operating system updates a translation table that allocates the physical memory to I/O devices coupled to the DMA engine. Specifically, the translation table is used during a DMA operation to map a virtual address provided by the I/O device to a physical address in the memory modules. If the DMA engine is underutilized, the operating system may update the translation table such that additional virtual address maps to a memory location on a more energy efficient memory module. For example, if the DMA engine is performing read/write operations only 40% of the time, the operating system may map more virtual addresses in the translation table to PCM modules instead of DRAM modules. Doing so may require more time for the DMA operation to complete, but the computing system may consume less power when performing the operation. Alternatively, if the operating system determines that the DMA engine is over-utilized—e.g., is busy 85% of the time—some portion of the virtual addresses may be mapped to DRAM which provides greater access speeds than PCM. Accordingly, the DMA operation may be performed in a shorter amount of time, thereby decreasing the utilization of the DMA engine but increasing the amount of power drawn relative to performing the DMA operation using PCM.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A computer program product for optimizing a computing system, the computer program product comprising:
    a non-transitory computer-readable storage medium having computer-readable program code embodied therewith, the computer-readable program code comprising computer-readable program code configured to:
        receive one or more performance metrics of a direct memory access (DMA) engine, the DMA engine is configured to assist in performing at least one memory access operation in one of a first memory module and a second memory module in the computing system, wherein the first and second memory modules are different types of memory devices, wherein the first memory module consumes less energy to perform the memory access operation than the second memory module and the second memory module requires less time to perform the memory access operation than the first memory module;
        upon determining, based on a first of the one or more performance metrics corresponding to energy efficiency, that the DMA engine is underutilized according to a first threshold, reconfigure an address translation table such that the first entry in the table maps the first virtual address to the first physical address corresponding to the first memory module;
        upon determining, based on a second one of the one or more performance metrics corresponding to timing, that the DMA engine is over-utilized according to a second threshold, reconfigure the table such that a second entry in the table maps a second virtual address to a second physical address corresponding to the second memory module.

2. The computer program product of claim 1, wherein, before reconfiguring the first entry in the table, the first entry mapped the first virtual address to a first previous memory module that consumes more energy when performing the memory access operation than the first memory module.

3. The computer program product of claim 2, wherein the one or more performances metric of the DMA engine are selected from the group consisting of: idle time of the DMA engine, time used by the DMA engine to complete one or more DMA operations, power consumption of the DMA engine, and temperature of the DMA engine.

4. The computer program product of claim 1, further comprising computer-readable program code configured to:
    perform a direct memory address operation using the DMA engine to transfer a data page to one of the first and second memory modules, wherein one of the first and second entries identifies a memory location in one of the first and second memory modules associated with the data page.

5. The computer program product of claim 4, wherein the direct memory address operation transfers the data page between an I/O adapter and one of the first and second memory modules without the data page being processed by a central processor unit.

6. The computer program product of claim 1,
    wherein the at least one memory access operation comprises performing one of a DMA read and a DMA write.

7. A computing system, comprising:
    a first memory module;
    a second memory module, wherein the first and second memory modules are different types of memory devices, wherein the first memory module consumes less energy to perform a memory access operation than the second memory module and the second memory module requires less time to perform the memory access operation than the first memory module;
    a direct memory access (DMA) engine configured to assist in performing the memory access operation in one of the first memory module and the second memory module; and
    a memory manager configured to receive one or more performance metrics of the DMA engine,
    wherein, upon determining, based on a first of the one or more performance metrics corresponding to energy efficiency is based on a first threshold, and the memory manager is configured to remap an address translation table such that a first entry in the table maps a first virtual address to a first physical address corresponding to the first memory module,
wherein, upon determining, based on a second one of the one or more performance metrics corresponding to timing that the DMA engine is over-utilized according to a second threshold, the memory manager is configured to remap the table such that a second entry in the table maps a second virtual address to a second physical address corresponding to the second memory module.

8. The computing system of claim 7, further comprising:
a first previous memory module, wherein, before reconfiguring the first entry in the table, the first entry mapped the first virtual address to the first previous memory module that consumes more energy when performing the memory access operation than the first memory module; and
a second previous memory module, wherein, before reconfiguring the second entry in the table, the second entry mapped the second virtual address to a second previous memory module that requires more time to perform the memory access operation than the second memory module.

9. The computing system of claim 7, further comprising a memory management unit configured to facilitate data transfer between the DMA engine and the first and second memory modules.

10. The computing system of claim 9, further comprising a central processing unit configured to initiate a DMA operation by sending an instruction to the memory management unit, wherein the at least one memory access operation is the DMA operation, and wherein data transferred between the DMA engine and the first and second module during the DMA operation does not flow through the central processing unit.

11. The computing system of claim 9, wherein the translation table is located within the memory management unit.

12. The computing system of claim 7, further comprising an input/output adapter configured to couple to one or more input/output devices, wherein the DMA engine is within the input/output adapter, wherein the at least one memory access operation transfers data from the one or more input/output device to one of the first and second memory modules.

13. The computing system of claim 7,
wherein the at least one memory access operation comprises performing one of a DMA read and a DMA write.

14. A computer program product for optimizing a computing system, the computer program product comprising:
a non-transitory computer-readable storage medium having computer-readable program code embodied therewith, the computer-readable program code comprising computer-readable program code configured to:
receive a performance rate of a direct memory access (DMA) engine, the DMA engine is configured to assist in performing at least one memory access operation in one of a first memory module and a second memory module in the computing system, wherein the first and second memory modules are different types of memory devices, wherein the first memory module consumes less energy to perform the memory access operation than the second memory module and the second memory module requires less time to perform the memory access operation than the first memory module; and
upon determining based on the performance metric, that the DMA engine is under-utilized according to a first threshold, reconfigure an address translation table such that a first entry in the table re-maps a first virtual address from a first physical address corresponding to the first memory module to a second physical address corresponding to the second memory module in order to effect a change in the utilization rate of the DMA engine;
upon determining, based on the performance metric, that the DMA engine is over-utilized according to a second threshold, reconfigure the table such that the second entry in the table maps the second virtual address to the second physical address corresponding to the second memory module.

15. The computer program product of claim 14,
wherein the at least one memory access operation comprises performing one of a DMA read and a DMA write.

* * * * *